United States Patent
Ochi et al.

[11] Patent Number: 6,148,768
[45] Date of Patent: Nov. 21, 2000

[54] PET LITTER FOR DISPOSAL OF ANIMAL WASTES AND PROCESS FOR PRODUCING THE SAME

[75] Inventors: Kengo Ochi; Hiroshi Tsuboi, both of Kagawa, Japan

[73] Assignee: Uni-Heartous Corporation, Tokyo, Japan

[21] Appl. No.: 09/179,645

[22] Filed: Oct. 27, 1998

[30] Foreign Application Priority Data

Oct. 30, 1997 [JP] Japan .................................. 9-298653

[51] Int. Cl.⁷ .................................................. A01K 1/015
[52] U.S. Cl. ...................................................... 119/172
[58] Field of Search ................................ 119/172, 171, 119/173; 502/428

[56] References Cited

U.S. PATENT DOCUMENTS

| | | | |
|---|---|---|---|
| 4,376,422 | 3/1983 | Whitehead et al. | 119/172 |
| 4,378,756 | 4/1983 | Whiteman | 119/172 |
| 4,409,925 | 10/1983 | Brundrett et al. | 119/173 |
| 4,444,148 | 4/1984 | Lander | 119/165 |
| 4,541,359 | 9/1985 | Hickey et al. | 119/172 |
| 4,619,862 | 10/1986 | Sokolowski et al. | 428/221 |
| 4,621,011 | 11/1986 | Fleischer et al. | 428/221 |
| 5,195,465 | 3/1993 | Webb | 119/172 |
| 5,566,642 | 10/1996 | Ochi | 119/171 |
| 5,609,123 | 3/1997 | Luke | 119/173 |
| 5,664,523 | 9/1997 | Ochi et al. | 119/173 |
| 5,680,830 | 10/1997 | Kawaguchi et al. | 119/172 |
| 5,724,915 | 3/1998 | Ochi et al. | 119/173 |

FOREIGN PATENT DOCUMENTS

| | | |
|---|---|---|
| 0293143A1 | 1/1989 | European Pat. Off. . |
| 0717928A1 | 6/1996 | European Pat. Off. . |
| 530873 | 2/1993 | Japan . |
| 549360 | 3/1993 | Japan . |
| 67051 | 1/1994 | Japan . |
| 6-22659 | 2/1994 | Japan . |
| 678643 | 3/1994 | Japan . |
| 659142 | 8/1994 | Japan . |
| 2516060 | 4/1996 | Japan . |
| 9252675 | 9/1997 | Japan . |
| 1132608 | 2/1999 | Japan . |

*Primary Examiner*—Peter M. Poon
*Assistant Examiner*—Yvonne R. Abbott
*Attorney, Agent, or Firm*—Darby & Darby

[57] ABSTRACT

Pet litter for disposal of animal wastes, which comprises granular bodies containing fiber and/or super absorbent polymer and each of the granular bodies is compressed to be flat-shaped. The pet litter can readily absorb animal wastes and can be effectively prevented from being scattered off by animal's legs in spite of its lightness.

13 Claims, 1 Drawing Sheet

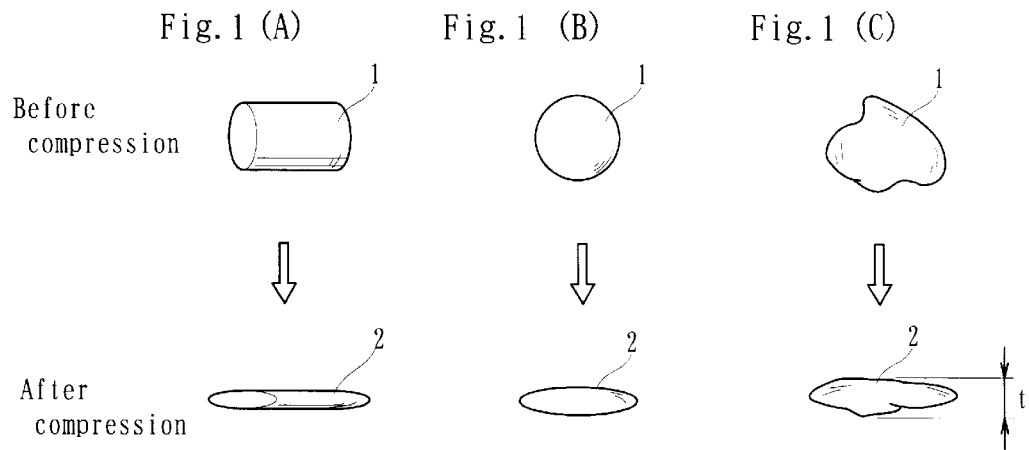
Fig. 1 (A)  Fig. 1 (B)  Fig. 1 (C)
Before compression
After compression
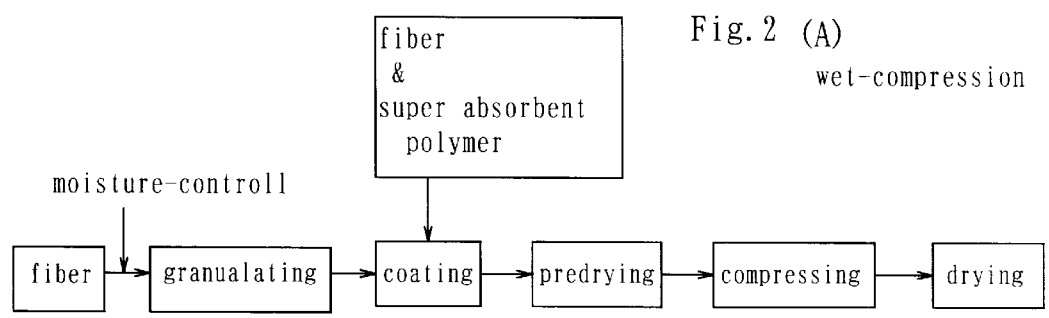
Fig. 2 (A) wet-compression
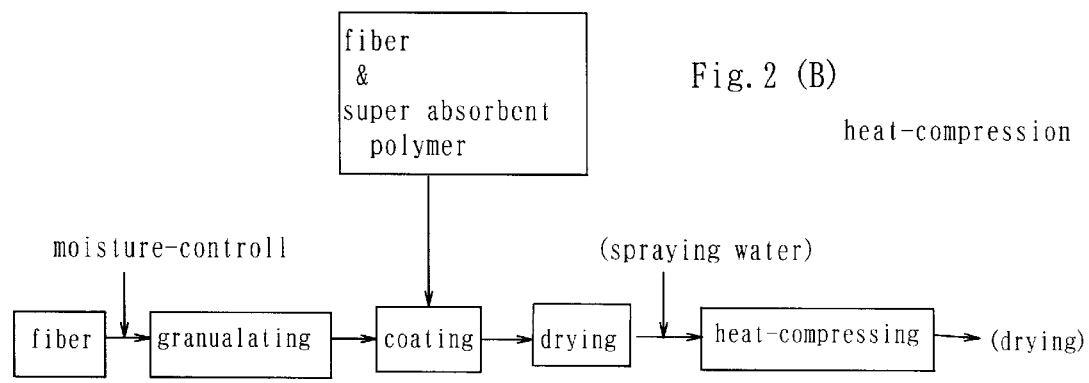
Fig. 2 (B) heat-compression

PET LITTER FOR DISPOSAL OF ANIMAL WASTES AND PROCESS FOR PRODUCING THE SAME

BACKGROUND OF THE INVENTION

1. Field of the Invention

The present invention relates to pet litter comprising a plurality of granular bodies for disposal of animal wastes excreted from pets such as cats, dogs, pigs, rats, and so on, and also relates to a process for producing the same.

2. Description of the Related Art

In order to dispose of animal wastes in a simple and easy way, pet litter, generally known as "cat litter" comprised of a plurality of bodies composed of zeolite, bentonite, or pulp, has long been used. The bodies are spread all over the place where animals excrete, such as tray, so that the excrement can be absorbed. After absorbing the excrement, the used ones are removed from the tray, except for the ones which remains intact, and then the tray is replenished with new ones just for the removed amount.

The above pet litter for disposal of animal wastes however poses some problems. For example, the bodies are scattered off from the tray by being caught by animal's hair or scraped out by animal's legs at the time of excretion. This is true particularly for the ones which have spherical shape.

In Japanese Patent Laid-open No. H6-22659, granular bodied pet litter for disposal of animal wastes is disclosed. The granular body of the pet litter comprises a core and a skin layer, each containing super absorbent polymer and pulp, and the water contents in the core and skin layer are each controlled. In order prevent the bodies of the pet litter from being easily scattered off from the tray, the bodies are made highly dense and heavy in weight, by controlling the water contents in the core and the skin layer. However, because of the heaviness, its transportation becomes so laborious.

SUMMARY OF THE INVENTION

It is an object of the present invention to provide pet litter for disposal of animal wastes, which bodies are not easily scattered from the place where animals excrete.

It is another object of the present invention to provide pet litter for disposal of animal wastes, which has excellent characteristic in absorbing animal wastes or sticking to the same as well as light characteristic in weight.

The above-mentioned objects of the present invention can be attained by pet litter for disposal of animal wastes, comprising a plurality of granular bodies containing at least one raw material selected from the group consisting of fiber and super absorbent polymer, each of the granular bodies being compressed to be flat-shaped.

The pet litter of the present invention is produced by a process comprising:

a step of forming a plurality of granular bodies containing at least one raw material selected from the group consisting of fiber and super absorbent polymer; and a step of compressing each of the granular bodies to be flat-shaped.

BRIEF DESCRIPTION OF THE DRAWINGS

FIGS. 1(A), 1(B), and 1(C) each schematically shows the shapes which a granular body of the present invention assumes before and after compression.

FIGS. 2(A) and 2(B) are flow diagrams, showing a wet-compression and a heat-compression, respectively.

DESCRIPTION OF THE PREFERRED EMBODIMENTS

In the present invention, pet litter comprises a plurality of granular bodies and each of the granular bodies is compressed to be flat-shaped. Due to the flat shape of these granular bodies, which are to be spread all over a tray or the like, the bodies of the pet litter can keep their position comparatively stably even when an animal is put on the tray. Therefore, it is difficult for animal's legs to be buried into the pet litter. Particularly, this effect is salient in the case of small animals such as cats, and can inhibit the animals from scraping the granular bodies to outside of the tray. Therefore, scattering of the granular bodies can be prevented as well. In addition, while compression reduces the total volume of the pet litter, the absorption characteristic of the pet litter can be maintained as much as the ones before compression.

The "granular body" herein used means a granular-shaped substance made from fiber and/or super absorbent polymer as raw materials being processed into granular-shape by means of extrusion, or the one being processed into the same by means of cutting, crushing or the like.

For example, the granular body before compression has cylindrical shape, spherical shape or odd shape as shown in FIGS. 1(A), 1(B) and 1(C). Compression may be conducted by using a press plate such that the granular body receives pressure in one direction. Compression may also be conducted by having the granular body pass through pressure rolls. After compression, the granular body becomes flat-shaped one as shown in FIGS. 1 (A), 1(B) and 1(C). The "flat shape" herein used means the shape of the granular body after compression which is relatively flatter in shape than the one before compression.

When the pet litter is produced for cats, the width of the granular body in the direction other than the direction of compression is preferably 4 mm or more. Because the distance between the cat's claws adjacent to each other is generally less than 4 mm, granular bodies smaller than the size will be caught into the spaces between the cat's claws and consequently scattered from the tray.

Although the granular body may be formed from fibers and/or super absorbent polymer, it is preferred that the granular body is made of fiber alone or combination of fiber and super absorbent polymer, from the view point of manufacturing cost and easiness of handling. In the case of fiber alone, the fiber should preferably have water-absorbing characteristic.

While the above-mentioned fiber may be either natural fiber or chemical fiber or both, the natural fiber is preferable because of its good water absorption characteristic and its easiness for granulation. Examples of the natural fiber include cellulose fiber such as pulp, cotton, paper powder and sawdust. Among these examples, pulp and paper powder are more preferable because of their light weight and high water absorption characteristic. As for the pulp, furthermore, regenerated pulp or waste materials generated in the production of paper diapers may also be used.

The super absorbent polymer is the one which can absorb pure water more than 20 times (preferably more than 100 times) its own weight. As the super absorbent polymer, any publicly known materials, such as crosslinked polyacrylic acid, addition polymer of maleic anhydride, polyethers, condensation polymers, polysaccharide (such as starch and cellulose), and protein (such as collagen) may be used. They may be used alone or in combination with two or more materials. Among these examples, the crosslinked polyacrylic acid is desirable because of its low price and high water absorption characteristic.

Compression is preferably carried out in such a way that the thickness of granular body becomes 3 mm or less. That is, it is preferred that the thickness of the granular body in the direction of compression (indicated by "t" in FIG. 1(C)) is 3 mm or less. When the thickness "t" is 3 mm or less, the animal's legs can be effectively prevented from being buried into the granular bodies. Further more, by making the thickness "t" 3 mm or less, it can be prevented that the granular bodies are caught by animal's hair. Thus, scattering of the bodies of pet litter from the tray can be prevented.

In addition, compression can reduce fluffs on the surface of the granular body and thereby produce a smooth surface thereof, preventing the granular bodies from being caught by animal's hair.

After compression, it is preferred that a bulk density of the pet litter is 0.3 g/cm$^3$ or less. The transportation of the pet litter becomes easy by reducing the bulk density. The bulk density should more preferably be 0.25 g/cm$^3$ or less. The "bulk density" herein used is defined as the weight of a product in a certain volume divided by the certain volume. It is expressed in terms of weight (g) per unit volume (cm$^3$).

More preferably, the granular body is composed of a core containing the fiber and a skin layer which covers the core, containing the fiber and the super absorbent polymer. In this structure, the skin layer becomes sticky when it absorbs water, thereby causing the granular bodies to stick to one another to form lumps comprised of a plurality of the bodies. Thus, the portion of the pet litter which absorbed the animal waists can be easily removed by removing the lumps. Furthermore, the granular body having such a dual structure and being compressed can effectively absorb the animal wastes and/or stick to the same, despite its low bulk density.

The fibers of the core and the skin layer may be different from each other. For example, the fiber of the core may be sludge pulp, and the fiber of the skin layer may be crushed pulp.

The skin layer is composed of the fiber and the super absorbent polymer in such a preferable ratio that the former: 5–70% by weight and the latter: 95–30% by weight.

Further, the skin layer preferably contains an anti-powdering agent, such as polyethylene glycol, glycerin, molasses, carboxymethylcellulose and polyvinyl alcohol. Among these examples, polyethylene glycol is more preferable. The content of the anti-powdering agent is preferably 1% by weight or less of the skin layer.

The fiber and the super absorbent polymer used in the present invention may contain a binder. Examples of the binder include natural polymers (such as starch and carboxymethylcellulose), synthetic resins (such as polyurethane resin), natural rubbers, and synthetic rubbers.

The pet litter of the present invention is produced by a process comprising:

a step of forming a plurality of granular bodies containing at least one raw material selected from the group consisting of fiber and super absorbent polymer; and a step of compressing each of the granular bodies to be flat-shaped.

In the compressing step, preferably, the granular bodies are compressed while containing water. Such compression in a wet state can effectively reduce the fluffs on the surface of the granular body to produce a smooth surface thereof. Further more, compression in a wet state can prevent shape recovery of the granular body, i.e., can prevent the granular body from recovering back to its original shape before compression. The granular body having the dual structure is easy to recover its original shape if it is compressed in an ordinary dry compression process. Therefore compression in a wet state is particularly desirable to the granular body having the dual structure.

Examples of compression in a wet state include wet-compression and heat-compression.

Wet-compression is performed on the granular bodies which have undergone predrying and still contain a certain amount of water. After such compression, the remaining water is removed by drying.

FIG. 2(A) is a flow diagram which shows wet-compression used in a production process of the pet litter having a dual structure. The first step is the granulation of fiber such as sludge pulp, processing the fiber into a core while moisture-controlling. The core is coated with a skin layer composed of fiber and super absorbent polymer. The resulting granular body having a dual structure undergoes predrying to such an extent that the water content thereof is about 20% by weight. After predrying, the granular bodies are all compressed in one direction using a press plate at a normal temperature. Followed by the subsequent drying step, the pet litter of the present invention will be obtained.

At the time of compression, the water content of the granular bodies preferably ranges from 20 to 40% by weight. If compression is performed on the granular body with the water content lower than 20% by weight, there is a possibility that shape recovery of the granular bodies occurs after compression. If compression is performed on the granular body with the water content higher than 40% by weight, there is a possibility that compression results in crushing the granular bodies.

Further, after compression, it is preferred that the granular bodies are dried to such an extent that the water content of the granular bodies is 10% by weight or less. If the water content of the granular bodies is higher than 10% by weight, the resulting pet litter becomes poor in water absorption characteristic and vulnerable to mildew.

FIG. 2(B) is a flow diagram which shows heat-compression used in a production process of the pet litter having a dual structure. The steps to form the granular bodies having a dual structure (composed of the core and the skin layer) are the same as those in the case of wet-compression mentioned above. In heat-compression, the granular bodies are compressed after being dried, for example, to such an extent that the water content thereof is 10% by weight or less.

The granular bodies thus dried are then compressed by means of hot press plates, hot press rolls or the like. When the granular bodies are compressed while receiving heat at the same time, the granular bodies hardly restore their original shapes before compression. The heating temperature is usually 100–180° C., preferably 120–150° C., which depends on the raw material and size of the granular bodies.

The granular bodies may be completely dried before heat-compression, but it takes a long time for heat-compression to flatten the granular bodies. In such a case, the granular bodies are preferably sprayed with water prior to heat-compression, as shown in FIG. 2(B), so that heat-compression can be accomplished in a short time. The water content of the granular bodies in the case of heat-compression may be lower than that in the case of wet-compression. If sprayed water is so excessive that it can not be satisfactorily removed during heat-compression, a drying step may be added as shown in FIG. 2(B).

Above-mentioned wet-compression and heat-compression are not specifically restricted in compressive force. It is usually 0.2–20 kg/cm$^2$, preferably 1–5 kg/cm$^2$. The compressive force depends on the kind of raw materials, the size and the water content of the granular bodies.

The pet litter for disposal of animal wastes of the present invention may contain any other substances so long as they don't spoil the effect of the present invention. Examples of the substance include water absorbent (such as bentonite and zeolite), inorganic matter (such as kaolin), perfume, colorant, surface-active agent, disinfectant, preservative, and deodorant.

The pet litter for disposal of animal wastes of the present invention may be used for almost any kind of animals; it is particularly useful for small pet animals, such as cats, rabbits, rats, mice, and squirrels, which are kept in a room.

The invention will be described in more detail with reference to the following examples, which are not intended to limit the scope of the present invention.

EXAMPLE 1

For Example, pet litter was prepared by using the wet-compression shown in FIG. 2(A).

Cores were prepared by extrusion from papermaking sludge ("S-97" from Kokkou Seishi Co,.Ltd. ) incorporated with water. The cores had an average grain size of 5 mm and a bulk density of 0.4 g/cm$^3$.

The cores were moistened with water and then coated with a powder of starch-sodium acrylate-graft copolymer (crosslinked) (from Sanyo Kasei Co,.Ltd.) and a pulp powder (from Nippon Seishi Co, .Ltd.), each in an amount 25 g per 100 g of the cores. The resulting stuffs were sprayed with polyethylene glycol (from Sanyo Kasei Co,.Ltd.) in an amount of 1 g per 150 g, to obtain granular bodies (granules).

The granular bodies thus obtained were predried until the water content decreased to 20% by weight. Subsequently, the granular bodies were compressed to a thickness of 3 mm under a compressive force of 5 kg/cm$^2$. Then, the granular bodies thus compressed were dried until the water content decreased below 10% by weight to obtain pet litter for disposing of animal wastes.

The bulk density of the pet litter thus obtained was 0.22 g/cm$^3$. The approximate grain size distribution of the granular body measured by JIS(Japanese Industrial Standard) R6002 using meshes of 2.00, 3.35 and 5.60 mm was as follows:

| | |
|---|---|
| less than 2.00 mm | 5% |
| from 2.00 to 3.35 mm | 20% |
| from 3.35 to 5.60 mm | 60% |
| from 5.60 mm up | 15% |

The pet litter was spread all over a 5-liter tray having a bottom dimension of 30×40 cm, and the tray was placed in a cage having a bottom dimension of 60×80 cm. A cat was kept in this cage for two days. The number of the granular bodies (granules) scattered off from the tray was counted. This test was run twice.

For Comparative example, pet litter was prepared in the same manner as above except that the granular bodies were not compressed. Comparative example was tested once in the same manner as mentioned above. The results are shown in Table 1.

TABLE 1

| | Example | | |
|---|---|---|---|
| Grain size (mm) | Number of granules scattered off from tray in 2 days (total in 2 runs) | Number of granules scattered off from tray (average in 1 day in 1 run) | Percentage |
| 1.00 to 2.00 | 8 | 2 | 4.1 |
| 2.00 to 3.35 | 30 | 8 | 15.4 |
| 3.35 to 5.60 | 95 | 24 | 48.7 |
| 5.60 up | 62 | 16 | 31.8 |
| Total | 195 | 50 | 100 |

| | Comparative Example | | |
|---|---|---|---|
| Grain size (mm) | Number of granules scattered off from tray in 2 days (total in 1 run) | Number of granules scattered off from tray (average in 1 day in 1 run) | Percentage |
| 1.00 to 2.00 | 108 | 54 | 26.5 |
| 2.00 to 3.35 | 109 | 55 | 26.8 |
| 3.35 to 5.60 | 146 | 73 | 35.9 |
| 5.60 up | 44 | 22 | 10.8 |
| Total | 407 | 204 | 100 |

EXAMPLE 2

Pet litter was prepared in the same manner as in Example 1. It was spread all over a tray having a bottom dimension of 20×30 cm in different thicknesses of 10, 30 or 60 mm as shown in Table 2, and the state of water absorption was measured in each thickness.

The test was conducted by dropping 20 ml of physiological saline (0.9% by weight aqueous solution of sodium chloride) to the pet litter from a buret (with its tip positioned 20 mm above the pet litter), and then picking up a lump of the granular bodies, which was formed by absorbing water, by using a spatula, thereby measuring the spread of water at the top and bottom thereof, the depth of water penetration, and the weight and volume of the pet litter (both on dry basis) necessary to absorb 20 ml of water. Further, easiness of picking up the lump from the tray was observed as well.

For Comparative examples, the same test as above was repeated by using samples specified in Table 2. The results are shown in Table 2.

TABLE 2

|  | Example | Comparative Example 1 | Comparative Example 2 | Comparative Example 3 |
|---|---|---|---|---|
| Thickness of Pet litter |  |  |  |  |
| Bulk density (g/cm$^3$) | 0.22 | 0.927 | 0.808 | 0.378 |
| Composition | pulp + pulp · super absorbent polymer | bentonite, crushed | bentonite, granulated | pulp + pulp · super absorbent polymer |
| Structure | Compressed dual structure | Single-structure | Single-structure | Dual structure |
| 10 mm |  |  |  |  |
| Weight of lump which absorbed water (g) | 27.17 | 60.81 | 58.57 | 43.03 |
| Spread of water at top (mm × mm) | 43 × 41 | 47 × 50 | 72 × 71 | 75 × 63 |
| Spread of water at bottom (mm × mm) | 53 × 47 | 70 × 69 | 97 × 88 | 99 × 84 |
| Depth of water penetration (mm) | 5 | 10 | 10 | 10 |
| Weight necessary for water absorption (g, dry basis) | 7.17 | 40.81 | 38.57 | 22.03 |
| Volume necessary for water absorption (cc, dry basis) | 32.59 | 44.02 | 47.74 | 60.93 |
| Remarks | slightly sticky, but no problems with removal | so sticky as to remove from tray bottom | | |
| 30 mm |  |  |  |  |
| Weight of lump which absorbed water (g) | 27.21 | 64.94 | 65.76 | 46.4 |
| Spread of water at top (mm × mm) | 49 × 44 | 48 × 46 | 35 × 34 | 32 × 32 |
| Spread of water at bottom (mm × mm) | — | — | 25 × 20 | 56 × 53 |
| Depth of water penetration (mm) | 25 | 25 | 30 | 30 |
| Weight necessary for water absorption (g, dry basis) | 7.21 | 44.94 | 45.76 | 26.40 |
| Volume necessary for water absorption (cc, dry basis) | 32.77 | 48.48 | 56.63 | 69.84 |
| Remarks | — | — | slightly sticky, but no problems with removal | |
| 60 mm |  |  |  |  |
| Weight of lump which absorbed water (g) | 27.8 | 66.94 | 72.48 | 56.22 |
| Spread of water at top (mm × mm) | 44 × 43 | 43 × 42 | 33 × 27 | 32 × 32 |
| Spread of water at bottom (mm × mm) | — | — | 10 × 10 | 38 × 35 |
| Depth of water penetration (mm) | 31 | 37 | 60 | 60 |
| Weight necessary for water absorption (g, dry basis) | 7.80 | 46.94 | 52.48 | 36.22 |
| Volume necessary for water absorption (cc, dry basis) | 35.45 | 50.64 | 64.95 | 95.82 |
| Remarks | — | — | slightly sticky, but no problems with removal | |

What is claimed is:

1. Pet litter for disposal of animal wastes, comprising a plurality of granular bodies each formed by granulating a core containing fiber and then covering the core with a skin layer containing fiber and super absorbent polymer, each of the granular bodies being compressed into a flat shape.

2. Pet litter as defined in claim 1, wherein the granular bodies are compressed into a flat shape while having a water content of at least 20% by weight so that shape recovery after compression is prevented.

3. Pet Litter as defined in claim 2, wherein each of the granular bodies after compression has a thickness of 3 mm or less in a direction of compression.

4. Pet litter as defined in claim 3, wherein a bulk density of the pet litter is 0.3 g/cm$^3$ or less.

5. Pet litter as defined in claim 4, wherein the fiber in the core and the skin layer is pulp.

6. Pet litter as defined in claim 5, wherein the skin layer contains 5 to 70% by weight of fiber and 95 to 30% by weight of super absorbent polymer.

7. Pet litter as defined in claim 6, wherein the skin layer contains at least one anti-powdering agent selected from the group consisting of polyethylene glycol, glycerin, molasses, carboxymethyl-cellulose and polyvinyl alcohol.

8. Pet litter as defined in claim 7, wherein the content of the anti-powdering agent is 1% or less by weight of the skin layer.

9. A process for producing pet litter for disposal of animal wastes, comprising the steps of:

granulating a core containing fiber;

covering the core with a skin layer containing fiber and super absorbent polymer to form a plurality of granular bodies; and compressing each of the granular bodies into a flat shape.

10. A process for producing pet litter as defined in claim 9, wherein the compressing step is preceded by a predrying step and followed by a drying step so that shape recovery after compression is prevented.

11. A process for producing pet litter as defined in claim 9, wherein the water content of the granular bodies is at least 20% by weight in the compressing step.

12. A process for producing pet litter as defined in claim 9, wherein the compressing step is preceded by a drying step and the granular bodies are compressed while receiving heat in the compressing step so that shape recovery after compression is prevented.

13. A process for producing pet litter as defined in claim 12, wherein the granular bodies are sprayed with water between the drying step and the compressing step.

* * * * *